US010050779B2

(12) United States Patent
Alness et al.

(10) Patent No.: US 10,050,779 B2
(45) Date of Patent: *Aug. 14, 2018

(54) CHECKOUT AND PAYMENT

(71) Applicant: Coinbase, Inc., San Francisco, CA (US)

(72) Inventors: Andrew E. Alness, Santa Cruz, CA (US); James Bradley Hudon, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,003

(22) Filed: Dec. 11, 2017

(65) Prior Publication Data

US 2018/0102898 A1 Apr. 12, 2018

Related U.S. Application Data

(62) Division of application No. 15/647,889, filed on Jul. 12, 2017, now Pat. No. 9,882,715, which is a division of application No. 14/716,100, filed on May 19, 2015, now Pat. No. 9,735,958.

(51) Int. Cl.
| | |
|---|---|
| *H04L 9/32* | (2006.01) |
| *H04L 9/08* | (2006.01) |
| *G06Q 20/06* | (2012.01) |
| *G06Q 20/38* | (2012.01) |
| *G06F 21/00* | (2013.01) |

(52) U.S. Cl.
CPC ......... *H04L 9/0819* (2013.01); *G06Q 20/065* (2013.01); *G06Q 20/3823* (2013.01)

(58) Field of Classification Search
CPC ............ H04L 2463/082; H04L 63/083; H04L 63/0861; H04L 9/0866; G06F 17/30377; G06F 21/32; G06F 21/34; G06F 21/445; G06F 21/602; G06F 9/54

See application file for complete search history.

(56) References Cited

U.S. PATENT DOCUMENTS

| | | |
|---|---|---|
| 8,855,318 B1 | 10/2014 | Patnala |
| 9,071,429 B1 | 6/2015 | Roth et al. |
| 2002/0116611 A1 | 8/2002 | Zhou et al. |
| 2003/0048906 A1 | 3/2003 | Vora et al. |
| 2005/0138374 A1 | 6/2005 | Zheng |
| 2007/0223706 A1 | 9/2007 | Gantman et al. |
| 2008/0263363 A1 | 10/2008 | Jueneman et al. |
| 2009/0254750 A1 | 10/2009 | Bono |
| 2010/0054458 A1 | 3/2010 | Schneider |
| 2010/0175061 A1 | 7/2010 | Maeda |

(Continued)

*Primary Examiner* — Gary S Gracia
(74) *Attorney, Agent, or Firm* — Jeffrey Schox (57) ABSTRACT

A key ceremony application creates bundles for custodians encrypted with their passphrases. Each bundle includes master key share. The master key shares are combined to store an operational master key. The operational master key is used for private key encryption during a checkout process. The operational private key is used for private key decryption for transaction signing in a payment process. The bundles further include TLS keys for authenticated requests to create an API key for a web application to communicate with a service and to unfreeze the system after it has been frozen by an administrator.

11 Claims, 8 Drawing Sheets

Checkout Process (56) References Cited

U.S. PATENT DOCUMENTS

| | | | |
|---|---|---|---|
| 2010/0235588 A1 | 9/2010 | Maeda et al. | |
| 2011/0202755 A1 | 8/2011 | Orsini et al. | |
| 2013/0010966 A1 | 1/2013 | Li | |
| 2013/0166455 A1* | 6/2013 | Feigelson | H04L 9/3234 705/64 |
| 2013/0191632 A1 | 7/2013 | Spector | |
| 2013/0246261 A1* | 9/2013 | Purves | G06Q 20/105 705/41 |
| 2013/0339738 A1 | 12/2013 | Shaw | |
| 2014/0019352 A1* | 1/2014 | Shrivastava | G06Q 20/3674 705/41 |
| 2014/0289118 A1* | 9/2014 | Kassemi | G06Q 20/02 705/44 |
| 2014/0297537 A1* | 10/2014 | Kassemi | G06Q 20/02 705/67 |
| 2014/0304171 A1* | 10/2014 | Mertens | G06Q 30/0641 705/71 |
| 2015/0039444 A1* | 2/2015 | Hardin | G06O 30/0273 705/14.69 |
| 2015/0120569 A1* | 4/2015 | Belshe | G06Q 20/3829 705/71 |
| 2015/0228004 A1* | 8/2015 | Bednarek | G06Q 30/0633 705/26.8 |
| 2015/0287026 A1* | 10/2015 | Yang | G06Q 20/3678 705/69 |
| 2015/0294308 A1* | 10/2015 | Pauker | G06Q 20/3827 705/67 |
| 2015/0302401 A1* | 10/2015 | Metral | G06Q 20/3829 705/71 |
| 2015/0310424 A1* | 10/2015 | Myers | G06Q 20/3678 705/69 |

* cited by examiner

CHECKOUT AND PAYMENT

CROSS-REFERENCE TO OTHER APPLICATIONS

This is a division of U.S. patent application Ser. No. 15/647,889, filed on Jul. 12, 2017, which is a division of U.S. patent application Ser. No. 14/716,100, filed on May 19,2015 now U.S. Pat. No.: 9,735,958.

BACKGROUND OF THE INVENTION

1). Field of the Invention

This invention relates to a computer system and method for storing and transacting bitcoin.

2). Discussion of Related Art

The Bitcoin network is a peer-to-peer payment system having a plurality of nodes that are connected to one another. Bitcoin exchange computer systems allow for users to exchange local currency into or out of bitcoin. Users send payments by broadcasting digitally signed messages to the Bitcoin network. Users may, for example, send and receive payments using mobile applications on mobile devices, client software or a web browser.

Transactions do not explicitly identify the payor and payee by name or wallet. Instead, a bitcoin transaction transfers ownership to a new address, referred to as a "Bitcoin address". The Bitcoin address is derived from the public portion of one or more cryptographic key pairs. The private portion of a key pair is not disclosed to the public. To send bitcoin sent to an address, a user broadcasts a payment message that is digitally signed with the associated private key.

Participants known as "miners" at miner computer systems verify and timestamp transactions into a shared public database called a "block chain". The miners are rewarded with transaction fees and newly minted bitcoin for their effort. The miner computer systems are specialized computers that append blocks of transactions to the block chain. Solving a cryptographic puzzle required to append a block carries a reward plus fees included in transactions in the block.

Host computer systems reside at various nodes and may host accounts or "wallets" that allow users to make and accept payments using bitcoin. The wallet stores the public key of the Bitcoin address and its associated private key.

It may be a security concern for users that the private keys of their Bitcoin addresses may be stolen from their wallets. Existing systems do not provide a solution for maintaining security over private keys while still allowing the users to checkout on a merchant page and making payments using their wallets.

SUMMARY OF THE INVENTION

Key Ceremony

The invention provides a host computer system including a key ceremony application configured to create a for-distribution master key, store the for-distribution master key in the memory, split the for-distribution master key into N shares, distribute the N shares among N custodians, clear the for-distribution master key from the memory.

The invention also provides a method of distributing security data to custodians including creating, by a key ceremony application, a for-distribution master key, storing, by the key ceremony application, the for-distribution master key in the memory, splitting, by the key ceremony application, the for-distribution master key into N shares, distributing, by the key ceremony application, the N shares among N custodians and clearing, by the key ceremony application, the for-distribution master key from the memory.

The invention further provides a computer-readable medium having stored thereon a set of instructions that, when executed by a processor of a computer carries out a method of distributing security data to custodians including creating, by a key ceremony application, a for-distribution master key, storing, by the key ceremony application, the for-distribution master key in the memory, splitting, by the key ceremony application, the for-distribution master key into N shares, distributing, by the key ceremony application, the N shares among N custodians and clearing, by the key ceremony application, the for-distribution master key from the memory.

API Key Generation

The invention also provides a host computer system including an application programmable interface (API) key generator forming part of a service and configured to receive a plurality of requests to create an API key, generate, upon a determination by the API key generator, that the plurality of requests to create an API key is at least equal to a minimum number (M) requests, an API key, store the API key and provide an output of the API key, and a web application configured to receive the API key, store the API key, receive a request, and communicate with the service in response to receiving the request, including providing the API key stored by the web application to the service, the service adapted to receive the API key from the web application, and execute a procedure only if the API key received from the web server matches the API key stored by the service.

The invention further provides a method of transacting bitcoin including receiving, by a service, a plurality of requests to create an application programmable interface (API) key, generating, by the service, upon a determination by the service that the plurality of requests to create an API key is at least equal to a minimum number (M) requests, an API key, storing, by the service, the API key, providing, by the service, an output of the API key, receiving, by a web application, the API key, storing, by the web application, the API key, receiving, by the web application, a request, communicating, by the web application, with the service in response to receiving the request, including providing the API key stored by the web application to the service, receiving, by the service, the API key from the web application and executing, by the service, a procedure only if the API key received from the web server matches the API key stored by the service.

The invention also provides a computer-readable medium having stored thereon a set of instructions that, when executed by a processor of a computer carries out a method of transacting bitcoin including receiving, by a service, a plurality of requests to create an application programmable interface (API) key, generating, by the service, upon a determination by the service that the plurality of requests to create an API key is at least equal to a minimum number (M) requests, an API key, storing, by the service, the API key, providing, by the service, an output of the API key, receiving, by a web application, the API key, storing, by the web application, the API key, receiving, by the web application, a request, communicating, by the web application, with the service in response to receiving the request, including providing the API key stored by the web application to the service, receiving, by the service, the API key from the web application and executing, by the service, a procedure only if the API key received from the web server matches the API key stored by the service.

Checkout and Payment

The invention further provides a host computer system including a web application configured to receive, prior to receiving a request for payment, a request for address, and requests an address from the service, a checkout module configured to receive the request for address, generate the address and the private key in response to the request for address, store the address and the encrypted private key in association with one another, and provide the address to the web application, the web application configured to receive the address from the service, transmit the address to the customer computer system, receive a request for payment to a bitcoin address, the request for payment including an amount of bitcoin to be paid, generate an unsigned transaction in response to receiving the request for payment, the unsigned transaction including the amount of bitcoin to be paid in the request for payment, requesting a signing of the unsigned transaction to create a signed transaction and a payment module configured to receive the request for signing the transaction, determine the address corresponding to the bitcoin address in the unsigned transaction, determine the private key stored in association with the address, sign the transaction with the private key to create the signed transaction, and provide the signed transaction to the web service, the web service receiving the signed transaction, and broadcasting the signed transaction over the bitcoin network.

The invention also provides a method of transacting bitcoin including receiving by a web application prior to receiving a request for payment, a request for address, requesting, by the web application, an address from a service, receiving, by the service, the request for address, generating, by the service, an address and a private key in response to the request for address, storing, by the service, the address and the private key in association with one another, providing, by the service, the address to the web application, receiving, by the web application, the address from the service, transmitting, by the web application, the address to the customer computer system, receiving, by a web application, a request for payment to a bitcoin address, the request for payment including an amount of bitcoin to be paid, generating, by the web application, an unsigned transaction in response to receiving the request for payment, the unsigned transaction including the amount of bitcoin to be paid in the request for payment, requesting, by the web application, a signing of the unsigned transaction to create a signed transaction, receiving, by the service, the request for signing the transaction, determining, by the service, the address corresponding to the bitcoin address in the unsigned transaction, determining, by the service, the private key stored in association with the address, signing, by the service, the transaction with the private key to create the signed transaction, providing, by the service, the signed transaction to the web service, receiving, by the web application, the signed transaction and broadcasting, by the web application, the signed transaction over the bitcoin network.

The invention further provides a computer-readable medium having stored thereon a set of instructions that, when executed by a processor of a computer carries out a method of transacting bitcoin including receiving by a web application prior to receiving a request for payment, a request for address, requesting, by the web application, an address from a service, receiving, by the service, the request for address, generating, by the service, an address and a private key in response to the request for address, storing, by the service, the address and the private key in association with one another, providing, by the service, the address to the web application, receiving, by the web application, the address from the service, transmitting, by the web application, the address to the customer computer system, receiving, by a web application, a request for payment to a bitcoin address, the request for payment including an amount of bitcoin to be paid, generating, by the web application, an unsigned transaction in response to receiving the request for payment, the unsigned transaction including the amount of bitcoin to be paid in the request for payment, requesting, by the web application, a signing of the unsigned transaction to create a signed transaction, receiving, by the service, the request for signing the transaction, determining, by the service, the address corresponding to the bitcoin address in the unsigned transaction, determining, by the service, the private key stored in association with the address, signing, by the service, the transaction with the private key to create the signed transaction, providing, by the service, the signed transaction to the web service, receiving, by the web application, the signed transaction and broadcasting, by the web application, the signed transaction over the bitcoin network.

Private Key Decryption

The invention also provides a host computer system including a service, a master key loader configured to store an operational master key in memory of the service, a database having an address and an encrypted private key stored in association with one another, a web application configured to receive a request for payment to a bitcoin address, the request for payment including an amount of bitcoin to be paid, generate an unsigned transaction in response to receiving the request for payment, the unsigned transaction including the amount of bitcoin to be paid in the request from payment, and request a signing of the unsigned transaction to create a signed transaction and a payment module configured to receive the request for signing the transaction, determine the address corresponding to the bitcoin address in the unsigned transaction, determine the encrypted private key stored in association with the address, decrypt the encrypted private key with the operational master key to generate a decrypted private key, and sign the transaction with the decrypted private key to create the signed transaction, the web application configured to receive the signed transaction, and broadcast the signed transaction over the bitcoin network.

The invention further provides a method of transacting bitcoin including storing, by a service, an operational master key in memory of a service and storing, by the service, the address and the encrypted private key in association with one another, receiving, by a web application, a request for payment to a bitcoin address, the request for payment including an amount of bitcoin to be paid, generating, by the web application, an unsigned transaction in response to receiving the request for payment, the unsigned transaction including the amount of bitcoin to be paid in the request from payment, requesting, by the web application, a signing of the unsigned transaction to create a signed transaction, receiving, by the service, the request for signing the transaction, determining, by the service, the address corresponding to the bitcoin address in the unsigned transaction, determining, by the service, the encrypted private key stored in association with the address, decrypting, by the service, the encrypted private key with the operational master key to generate a decrypted private key, signing, by the service, the transaction with the decrypted private key to create the signed transaction, receiving, by the web application, the signed transaction and broadcasting, by the web application, the signed transaction over the bitcoin network.

The invention also provides a computer-readable medium having stored thereon a set of instructions that, when executed by a processor of a computer carries out a method of transacting bitcoin including storing, by a service, an operational master key in memory of a service and storing, by the service, the address and the encrypted private key in association with one another, receiving, by a web application, a request for payment to a bitcoin address, the request for payment including an amount of bitcoin to be paid, generating, by the web application, an unsigned transaction in response to receiving the request for payment, the unsigned transaction including the amount of bitcoin to be paid in the request from payment, requesting, by the web application, a signing of the unsigned transaction to create a signed transaction, receiving, by the service, the request for signing the transaction, determining, by the service, the address corresponding to the bitcoin address in the unsigned transaction, determining, by the service, the encrypted private key stored in association with the address, decrypting, by the service, the encrypted private key with the operational master key to generate a decrypted private key, signing, by the service, the transaction with the decrypted private key to create the signed transaction, receiving, by the web application, the signed transaction and broadcasting, by the web application, the signed transaction over the bitcoin network.

Freeze Logic

The invention further provides a host computer system including a database having an address and a private key stored in association with one another, a web application receiving a request for payment to a bitcoin address, the request for payment including an amount of bitcoin to be paid, generating an unsigned transaction in response to receiving the request for payment, the unsigned transaction including the amount of bitcoin to be paid in the request from payment, and requesting a signing of the unsigned transaction to create a signed transaction and a payment module configured to receive the request for signing the transaction, determine the address corresponding to the bitcoin address in the unsigned transaction, determining the private key stored in association with the address, detect a freeze flag on-state, disallow signing of the transaction in response to detecting the freeze flag on-state, detect a freeze flag off-state, and allow signing of the transaction with the private key in response to detecting the freeze flag off-state, the web application receiving the signed transaction, and broadcasting the signed transaction over the bitcoin network.

The invention also provides a method of transacting bitcoin including storing, by a service, the address and the encrypted private key in association with one another, receiving, by a web application, a request for payment to a bitcoin address, the request for payment including an amount of bitcoin to be paid, generating, by the web application, an unsigned transaction in response to receiving the request for payment, the unsigned transaction including the amount of bitcoin to be paid in the request from payment, requesting, by the web application, a signing of the unsigned transaction to create a signed transaction, receiving, by the service, the request for signing the transaction, determining, by the service, the address corresponding to the bitcoin address in the unsigned transaction, determining, by the service, the private key stored in association with the address, detecting, by the service, a freeze flag on-state, disallowing, by the service, signing of the transaction in response to detecting the freeze flag on-state, detecting, by the service, a freeze flag off-state, allowing, by the service, signing of the transaction in response to detecting the freeze flag off-state, receiving, by the web application, the signed transaction and broadcasting, by the web application, the signed transaction over the bitcoin network.

The invention further provides a computer-readable medium having stored thereon a set of instructions that, when executed by a processor of a computer carries out a method of transacting bitcoin including storing, by a service, the address and the encrypted private key in association with one another, receiving, by a web application, a request for payment to a bitcoin address, the request for payment including an amount of bitcoin to be paid, generating, by the web application, an unsigned transaction in response to receiving the request for payment, the unsigned transaction including the amount of bitcoin to be paid in the request from payment, requesting, by the web application, a signing of the unsigned transaction to create a signed transaction, receiving, by the service, the request for signing the transaction, determining, by the service, the address corresponding to the bitcoin address in the unsigned transaction, determining, by the service, the private key stored in association with the address, detecting, by the service, a freeze flag on-state, disallowing, by the service, signing of the transaction in response to detecting the freeze flag on-state, detecting, by the service, a freeze flag off-state, allowing, by the service, signing of the transaction in response to detecting the freeze flag off-state, receiving, by the web application, the signed transaction and broadcasting, by the web application, the signed transaction over the bitcoin network.

BRIEF DESCRIPTION OF THE DRAWINGS

The invention is further described by way of example with reference to the accompanying drawings, wherein.

DETAILED DESCRIPTION OF THE INVENTION

Figure 1:
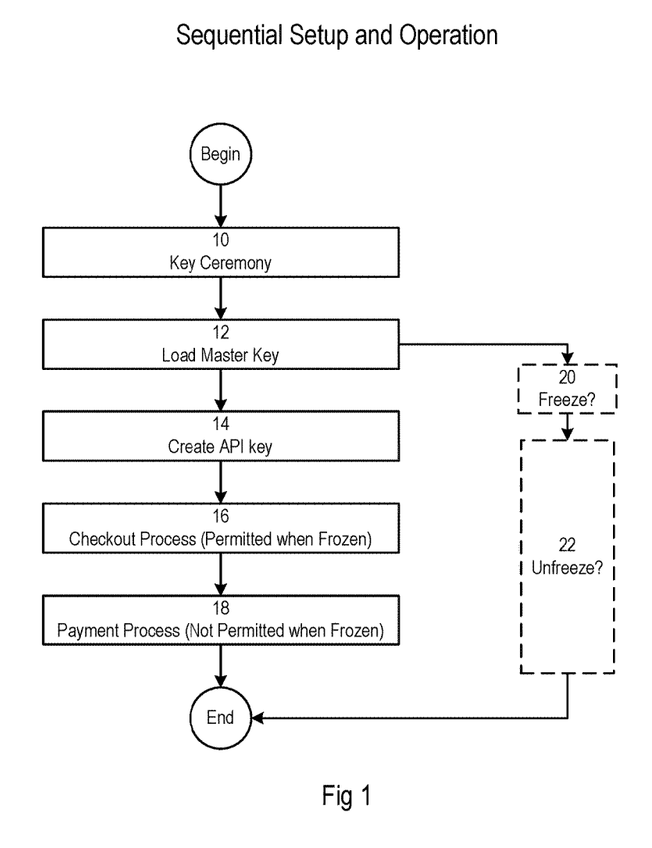
FIG. 1 is a flow chart illustration sequential setup and operation of a host computer system according to an embodiment of the invention.

FIG. 1 of the accompanying drawings illustrates the sequential setup and operation, at a high level, according to an embodiment of the invention. A key ceremony is first carried out (Step 10). Following the key ceremony, a master key is loaded (Step 12) and an application programmable interface (API) key is created (Step 14). Following the creation of the API key, a checkout process can be carried out (Step 16). A payment process (Step 18) is usually carried out after the checkout process.

At any point in time after the master key is loaded, the system can be frozen (Step 20). The system can be unfrozen after it has been frozen (Step 22) using keys from the key ceremony (Step 10). The checkout process (Step 16) can be carried out when the system is frozen and when the system is unfrozen. The payment process (Step 18) can only be carried out when the system is unfrozen and not when the system is frozen.

Figure 2:
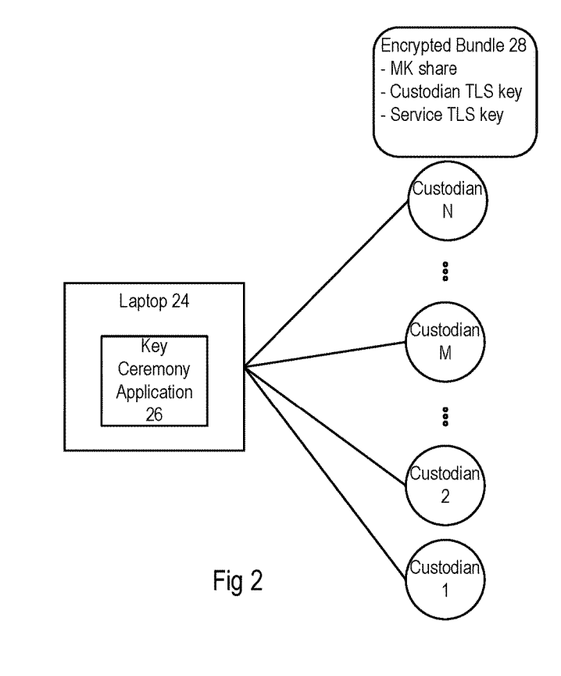
FIG. 2 is a block diagram illustrating a laptop of a master of ceremony and custodian computers for purposes of creating encrypted bundles having master key shares, custodian transport layer security (TLS) keys and a service TLS key.

FIG. 2 illustrates components that are in communication with one another in order to distribute master key (MK) shares, custodian transport layer security (TLS) keys and service TLS keys. The system includes a laptop 24 that has a key ceremony application 26. The laptop 24 is in the form of a distinct machine, but forms part of a larger security system of a host computer system. Custodians 1 to N represent respective custodian computer systems that are connected to the laptop 24 over a network such as the Internet. Custodians 1 to N are assembled. Only custodians 1 to M may be required for various security purposes, wherein M, is less than or equal to N. Each custodian 1 to N is provided an encrypted bundle 28 having a respective master key share, client TLS key, client TLS certificate, service TLS key, service TLS certificate, and certificate authority (CA). The master key shares and the custodian TLS keys are different from one bundle to the next and the service TLS keys are the same for all the bundles.

Figure 3:
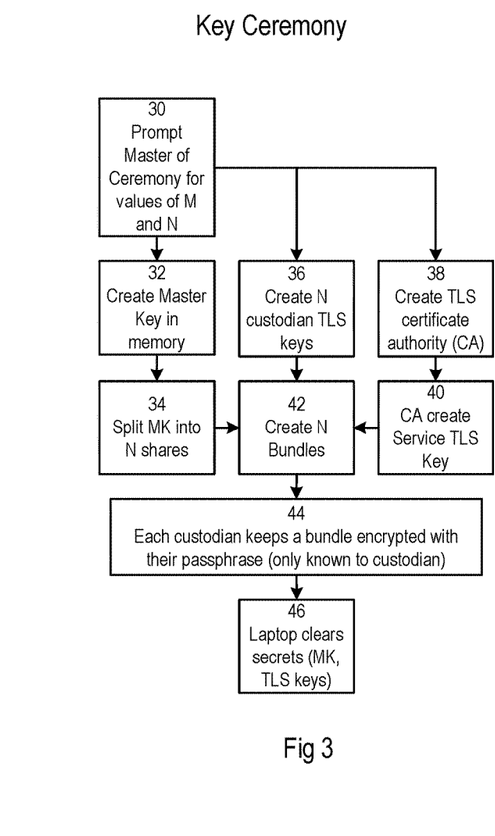
FIG. 3 is a flow chart illustrating a key ceremony that is executed by the computers of FIG. 2.

FIG. 3 illustrates a key ceremony between the systems shown in FIG. 2. At 30, the key ceremony application 26 prompts a master of ceremony for values of M and N. The master of ceremony then enters the respective values of M and N into the key ceremony application 26. At 32, the key ceremony application 26 creates a for-distribution master key in memory of the laptop 24. At 34, the key ceremony application 26 splits the for-distribution master key into N shares.

At 36, the key ceremony application 26 creates N custodian TLS keys. The custodian TLS keys are all different from one another.

At 38, the key ceremony application 26 creates a TLS certificate authority (CA). At 40, the certificate authority creates a service TLS key.

At 42, the key ceremony application 26 creates N bundles. Each bundle includes a respective share of the for-distribution master key, a respective custodian TLS key, and the service TLS key. Through an interactive script process between each custodian, 1 to N, and the key ceremony application 26, a respective custodian provides a respective passphrase to the key ceremony application 26. The key ceremony application 26 then encrypts the respective bundle for the respective custodian with their respective passphrase. The key ceremony application 26 then sends the respective encrypted bundles 28 to the respective custodians 1 to N. At 44, each custodian receives and keeps a bundle encrypted with their passphrase. The respective passphrase is only known to the respective custodian. At 46, the laptop 24 clears all secrets, including the for-distribution master key, the custodian TLS keys and the service TLS key. The for-distribution master key (in the form of master key shares), custodian TLS keys and service TLS key are now only present in the encrypted bundles 28 held by the respective custodians 1 to N, for security purposes.

Figure 4:
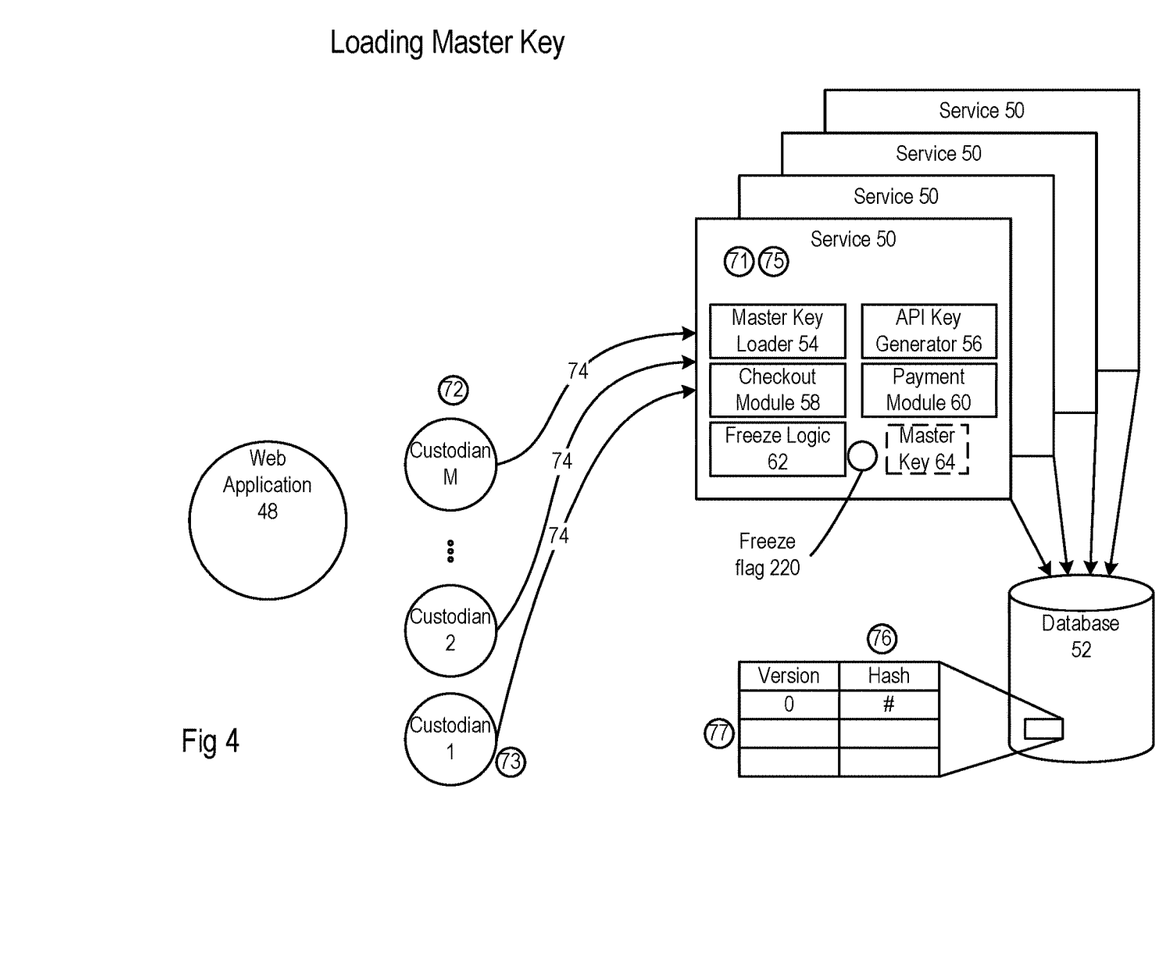
FIG. 4 is a block diagram illustrating how a master key is loaded within a service by custodians.

FIG. 4 illustrates components of a host computer system for storing and transacting bitcoin, including a web application 48, multiple instances of a service 50, and a database 52. Each one of the services 50 further includes a master key loader 54, an API key generator 56, a checkout module 58, a payment module 60 and freeze logic 62.

TLS is an open protocol for securing communications. TLS is used to communicate with the services 50. The client and the service 50 have public/private key pairs to encrypt messages. The certificate of the service 50 is used to communicate the specific key that it owns the client's certificate communicates the key that it owns. The certificates are issued by the CA. Client and server keys can be created right away, as well as the CA, but the client needs the CA and the client key, and the server certificate needs the CA and the server key.

FIG. 4 specifically illustrates loading of an operational master key 64 into the service 50 by the master key loader 54. At 71, a service instance is initialized. At 72, M custodians are assembled by the master key loader 54, wherein M is more than one, but less than N. At 73, each custodian, 1 to M, decrypts their respective bundle with their respective passphrase. Each custodian then sends the decrypted master key share to the service 50. The request by the respective custodian is authenticated by the custodian and service TLS keys by the service 50 as is commonly understood by one skilled in the art. After the service 50 receives the M shares, the service 50, at 75, derives the operational master key 64 from the M shares. All versions of the operational master key are hashed within the database 52. At 76, if the master key hash exists in the database, the service 50 ensures that the master key hash is the same. If the master key hash is the same, the service 50 can store the respective operational master key 64 within the service 50 for later use. Alternatively, at 77, if the master key hash does not exist, then the service 50 stores a new version and hash of the operational maser key within the database 52. At 78, the service 50 then stores the new version of the operational master key as the master key 64 within the service for later use.

After the master key 64 has been created the service 50, the custodians 1 to M disconnect from the service 50. At no point was the operational master key 64 shared with any one of the custodians 1 to M.

Figure 5:
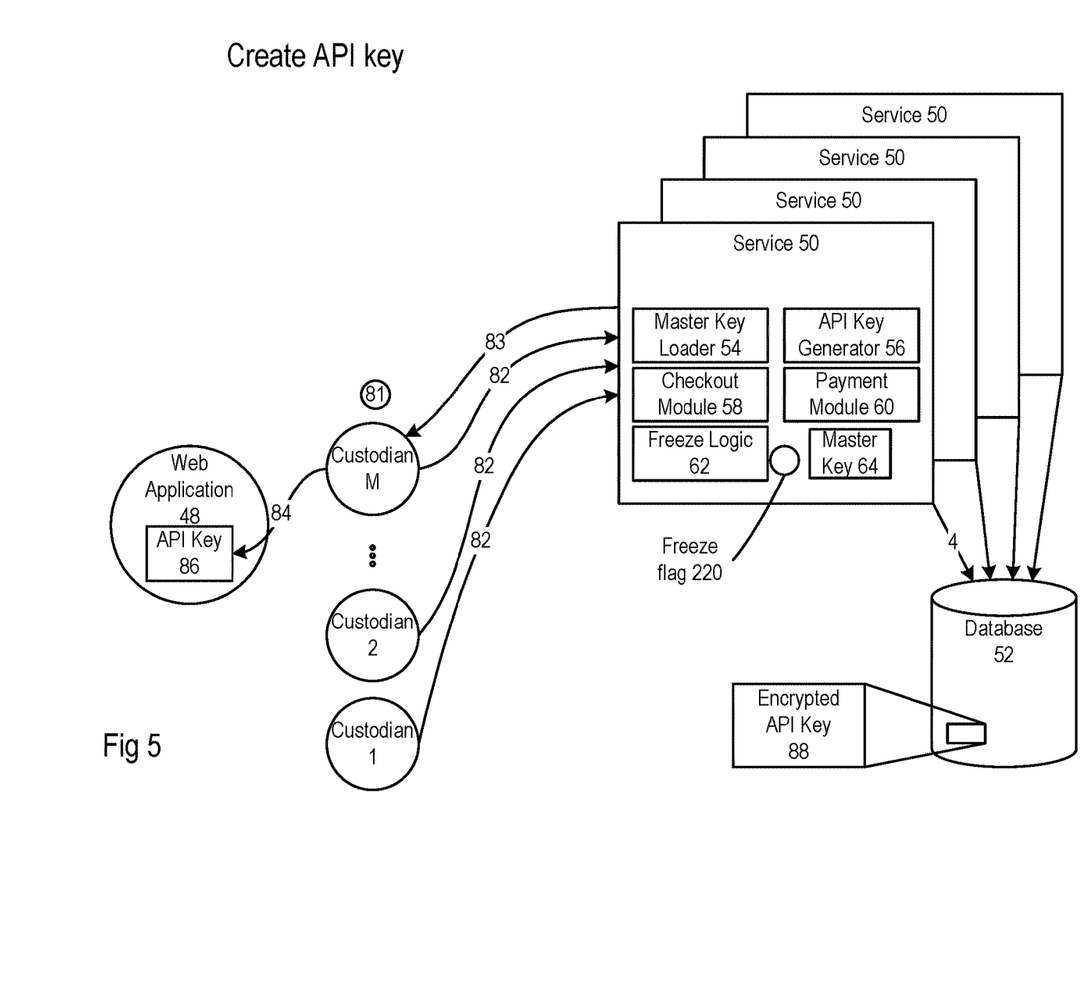
FIG. 5 is a block diagram illustrating how an application programmable interface (API) key is created by the custodians.

FIG. 5 illustrates the procedure for creating an API key that allows the web application 48 to communicate with the service 50. The API key is created by an API key generator 56 of the service 50. At 81, the API key generator 56 assembles M custodians, wherein M is 1<M<=N. At 82, each custodian, 1 to M, sends a request to the service 50 to create an API key. The request by the respective custodian is authenticated by the custodian and service TLS keys by the service 50. The API key generator 56 requires at least M requests to create an API key. At 83, after M requests, the API key generator 56 generates and returns a unique API key to custodian M. At 84, custodian M shares the API key with the web application 48. The web application 48 then stores the API key as API key 86.

The service 50 then encrypts the API key with the master key 64 and stores the API in an encrypted form as an encrypted API key 88 in the database 52. The web application 48 can communicate with the service 50. Any communication or request from the web application 48 with or to the service 50 includes the API key 86. When the service 50 receives the API key 86 from the web application 48, the service first decrypts the encrypted API key 88 with the master key 64 and determines whether the decrypted API key 88 is the same as the API key 86 received from the web application 48. If the API keys do not match, the service 50 does not execute any actions by the checkout module 58, payment module 60 or freeze logic 62. Only if the API keys match does the service 50 execute procedures by the checkout module 58, payment module 60 or freeze logic 62 as requested by the web application 48.

Figure 6:
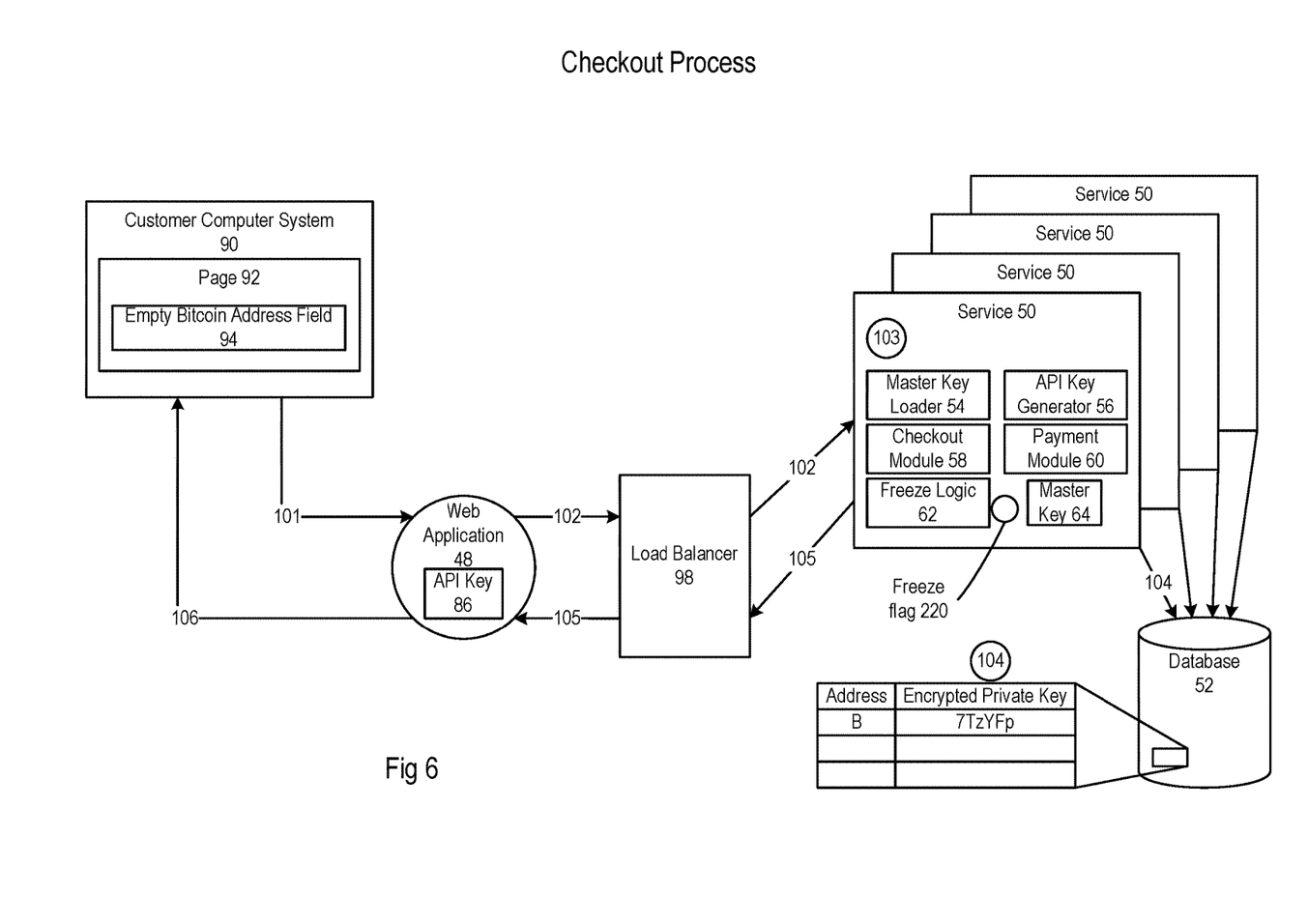
FIG. 6 is a block diagram illustrating a checkout process that is carried out by the host computer system communicating with a customer computer system.

FIG. 6 illustrates a checkout process that is initiated by a customer computer system 90. The customer computer system 90 has a page 92 within browser with an empty bitcoin address field 94. The page 92 may for example be a page of a merchant on which the user lands. At 101, the customer computer system 90 automatically requests an address over the Internet from the web application 48. At 102, the web application 48 requests the address from one of the services 50. A load balancer 98 determines which one of the respective services 50 the request is routed to based on the respective loads on the respective services 50. The checkout module 58 then executes the checkout process within the service 50. At 103, the checkout module 58 creates a private key. At 104, the checkout module 58 encrypts the private key with the operational master key 64 and stores the encrypted private key in the database 52. The checkout module 58 further generates an address and, at 104, stores the address "B" in association with the encrypted private key within the database 52.

At 105, the checkout module 58 provides the address ("B") through the load balancer 98 to the web application 48. When the web application 48 receives the address, the web application 48, at 106, sends the address to the customer computer system 90. The address then shows up within the previously empty bitcoin address field 94.

The private key is encrypted and stored within the database 52 without any human intervention and the private key is never shared with the web application 48. The checkout module 58 only executes the checkout process as described with reference to reference numerals 103, 104 and 105 if the web application 48 provides the API key 86 to the service 50 and the API key 86 received from the web application 48 matches the API key that was previously stored by the service 50 in the database 52 in encrypted form with reference to FIG. 5.

Figure 7:
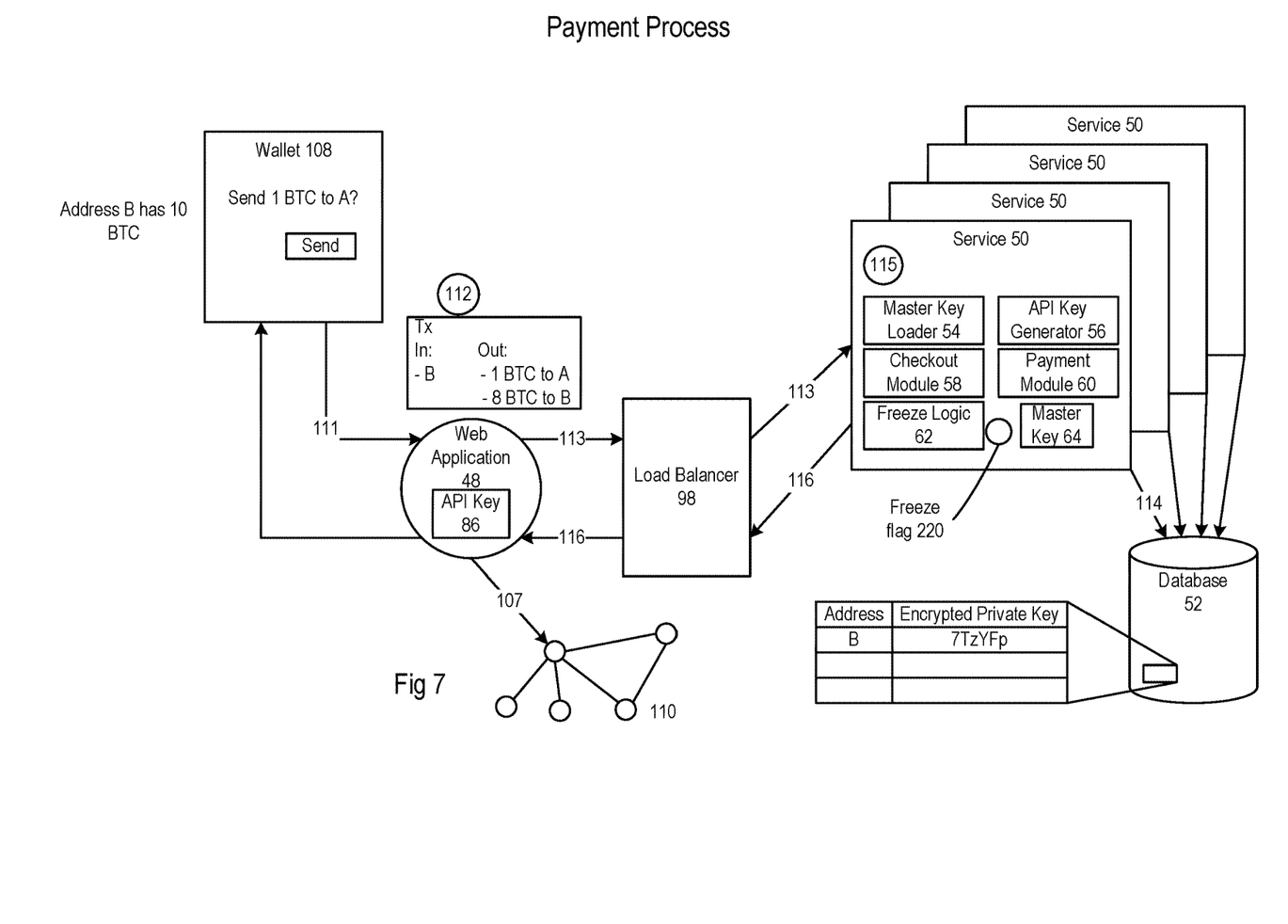
FIG. 7 is a block diagram illustrating a payment process that is carried out by the host computer system communicating with a wallet on a device of a customer.

FIG. 7 illustrates a payment process that is initiated by a wallet 108, for example on a mobile device or on a personal computer. It is assumed that the address "B" has 10 bitcoin (BTC) stored therein. When a user selects a "Send" button, the user, at 111, sends a request from the wallet 108 to the web application 48 to send 1 BTC to A. When the web application 48 receives the request transmitted at 111, the web application 48, at 112, generates an unsigned transaction (Tx). The transaction includes an "In" designating address "B". The transaction includes a "OUT" reference of 1 BTC to address "A" and 8 BTC to address "B". A further 1 BTC (not shown) represents a miner's fee.

At 103, the web application 48 sends the transaction through the load balancer 98 to one of the services 50. The web application 48 asks the service 50 to sign the transaction. The request from the web application 48 to the service 50 includes the API key 86. The service 50 authenticates the API key 86 and, only if authenticated, executes a payment process by the payment module 60.

At 114, the payment module 60 looks up the respective private key. The payment module 60 compares the address "B" in the transaction with the addresses in the database 52. When a match is found, the payment module 60 extracts the respective encrypted private key from the address "B" found in the database 52. The payment module 60 then decrypts the private key with the operational master key 64. At 115, the payment module 60 signs the transaction with the decrypted private key to create a signed transaction. At 106, the service 50 returns the signed transaction to the web application 48 via the load balancer 98. When the web application 48 receives the signed transaction, the web application 48, at 107, broadcasts the signed transaction to the bitcoin network 110. Further details of bitcoin transactions are described in U.S. patent application Ser. No. 14/660,296, filed on Mar. 17, 2015, which is incorporated herein in its entirety.

Figure 8:
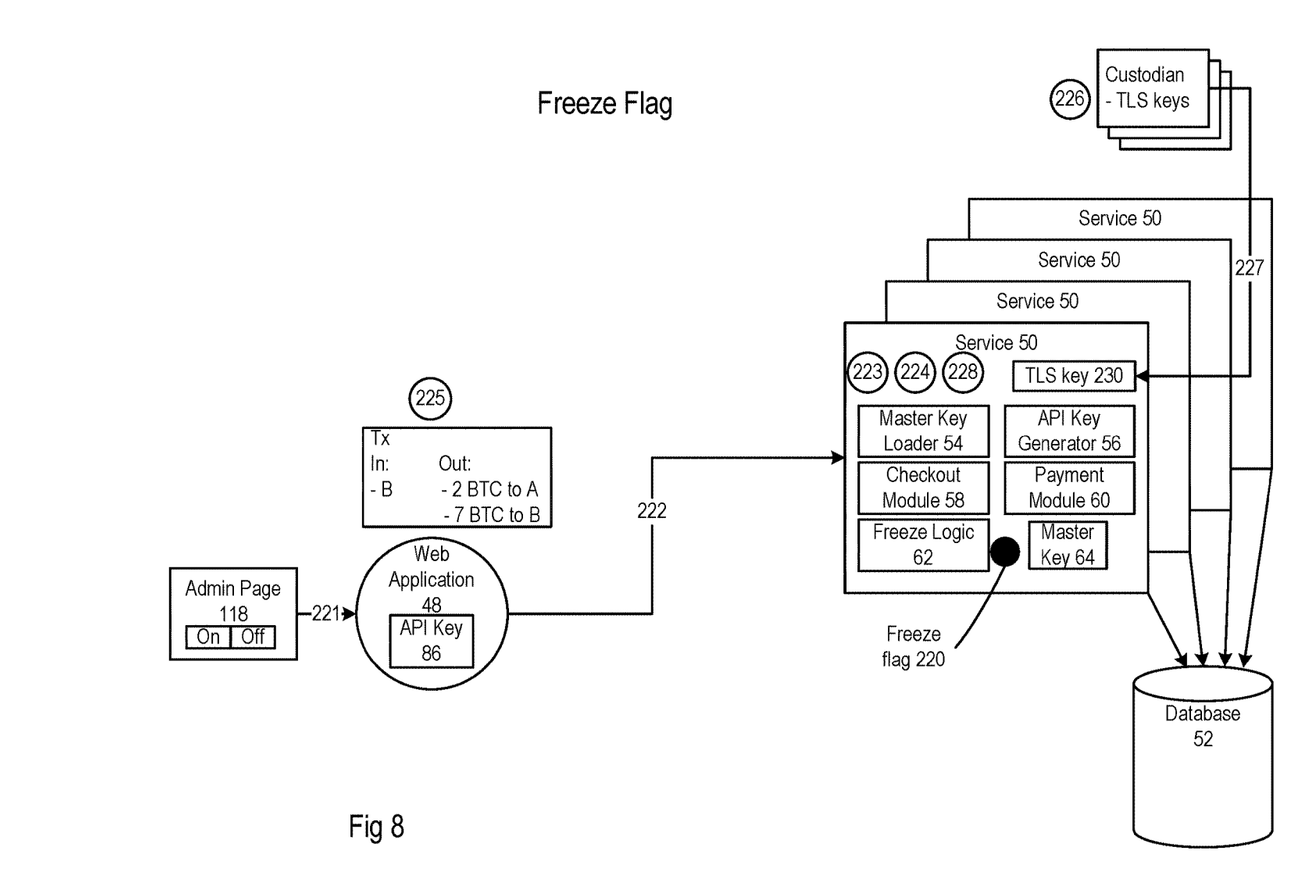
FIG. 8 is block diagram illustrating how a freeze flag is set by an administrator of the host computer system and how the freeze flag is reset by the custodians.

FIG. 8 illustrates a freeze flag process that is executed by the freeze logic 62. At 221, a host computer administrator flips a freeze switch from "off" to "on" on an admin page 118 of the web application 48. When the web application 48, at 221, detects the switching of the freeze switch on the admin page 118, the web application 48, at 222, sends a request to the service 50 to freeze. At 223, the freeze logic 62 of the service 50 sets a freeze flag 220 to a freeze flag on-state. The freeze flag in the preceding figures is shown as being in a freeze flag off-state represented as an empty circle. In FIG. 8, the freeze flag 220 is shown as a solid circle representing a freeze flag on-state. At 224, the checkout module 58 of the service 50 can continue to generate keys as described with reference to FIG. 6, but the payment module 60 is prevented by the freeze flag 220 from signing any transaction as described with reference to FIG. 7. At 225, any transaction that requires signing is queued and tried again later automatically, for example on a 5 minute interval or repeatedly on exponentially increasing intervals.

At 226, N custodians are assembled for purposes of unfreezing the service 50. The custodians may for example be assembled using a web interface that is provided by the freeze logic 62 and displayed within browsers of the respective custodians. At 227, each custodian sends an authenticated request to unfreeze the service to the service 50. Each request includes a respective custodian TLS key and the TLS key of the service 50 for purposes of encrypted authentication. Reference numeral 230 represents one TLS key that is received from one of the custodians. The service 50 then authenticates the request using the respective TLS key 230.

At 228, after the freeze logic 62 has received M requests to unfreeze the service, wherein M is 1<M<=N, the freeze logic 62 of the service 50 resets the freeze flag 220 to the freeze flag off-state. When the freeze flag is set to freeze flag off-state, the payment module 60 can again sign transactions. When the transaction that was queued at 225 is submitted by the web application 48 to the service 50 for signature, the payment module 60 proceeds to sign and return the transaction as described with reference to FIG. 7. It can thus be seen that payment can only be reactivated when M custodians request activation of payment, for purposes of security.

Figure 9:
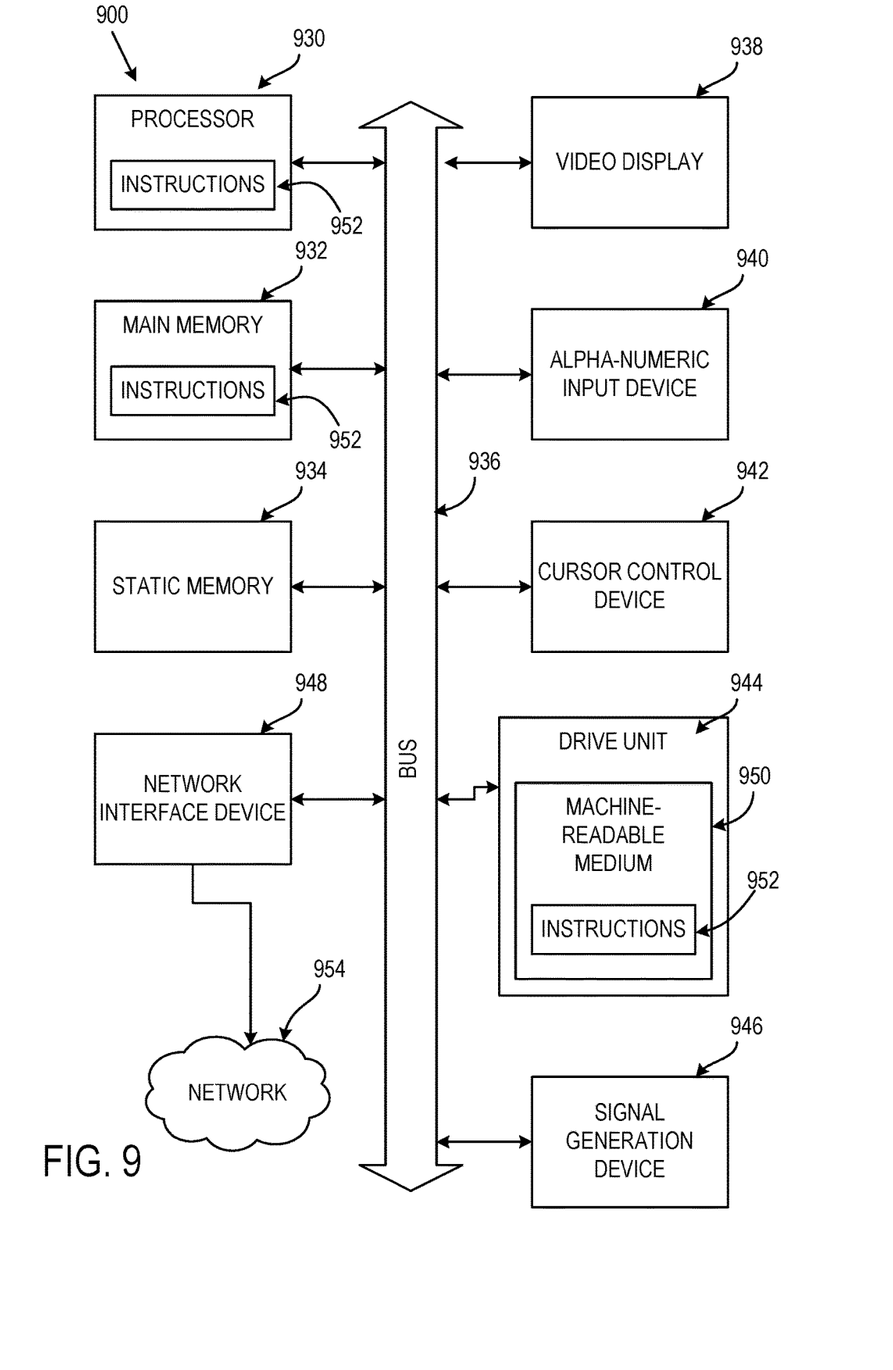
FIG. 9 is a block diagram of a machine in the form of a computer system forming part of the host computer system.

FIG. 9 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A host computer system executing on a set of host computer devices communicably coupled over a bitcoin network to a customer computer system executing on one or more of a set of customer computer devices, the host computer system comprising:
    a web application that receives, prior to receiving a request for payment, a request for a first address, and requests the first address from a service executing on the set of host computer devices;
    a checkout module that receives the request for the first address, generates the first address and the private key in response to the request for the first address, encrypts the private key to generate an encrypted private key, stores the first address and the encrypted private key, and provides the first address to the web application, wherein the web application: receives the first address from the service, transmits the first address to the customer computer system, receives a request for payment to a bitcoin address, the request for payment including an amount of bitcoin to be paid, generates an unsigned transaction in response to receiving the request for payment, the unsigned transaction including the amount of bitcoin to be paid in the request for payment, and requests a signing of the unsigned transaction to create a signed transaction; and
    a payment module that receives the request for signing the transaction from the checkout module, determines the first address corresponding to the bitcoin address in the unsigned transaction, determines the private key stored in association with the first address, signs the transaction with the private key to create the signed transaction, and provides the signed transaction to the web application, the web application receiving the signed transaction and broadcasting the signed transaction over the bitcoin network;
    wherein the web application, the checkout module, and the payment module are executed by one or more of the set of host computer devices.

2. The host computer system of claim 1, further comprising:
    a master key loader that stores an operational master key in memory of the service, wherein the checkout module encrypts the private key with the operational master key to generate an encrypted private key that is stored, and decrypts the encrypted private key with the operational master key to generate a decrypted private key for signing the transaction, wherein the master key loader is executed by one or more of the set of host computer devices.

3. The host computer system of claim 2, further comprising:
    a key ceremony application, executed by one or more of the set of host computer devices, that creates a for-distribution master key, stores the for-distribution master key in the memory, splits the for-distribution master key into N shares, distribute the N shares among N custodians, and clears the for-distribution master key from the memory; and
    wherein the master key loader receives at least M of the N shares, where M is equal to or less than N, and derives the operational master key from the M shares before storing the operational master key in the memory.

4. The host computer system of claim 1, further comprising a freeze flag logic, executed by one or more of the set of host computer devices, that detects a freeze flag on-state, disallows signing of the transaction in response to detecting the freeze flag on-state, detects a freeze flag off-state, and allows signing of the transaction in response to detecting the freeze flag off-state.

5. The host computer system of claim 4, wherein the freeze flag logic receives at least a plurality of authenticated requests to unfreeze transaction signing, and allows signing of the transactions upon a determination by the service that the plurality of authenticated requests is at least equal to a predetermined number.

6. A method of transacting bitcoin comprising:
    receiving, by a web application executed by one or more of a set of web application devices, prior to receiving a request for payment, a request for address;
    requesting, by the web application, an address from a service;
    receiving, by a service executed by one or more of a set of host computer devices, the request for address;
    generating, by the service, an address and a private key in response to the request for address;
    storing, by the service, the address and the private key in association with one another;
    providing, by the service, the address to the web application;
    receiving, by the web application, the address from the service;
    transmitting, by the web application, the address to a customer computer system;

receiving, by the web application, a request for payment to a bitcoin address, the request for payment including an amount of bitcoin to be paid;

generating, by the web application, an unsigned transaction in response to receiving the request for payment, the unsigned transaction including the amount of bitcoin to be paid in the request for payment;

requesting, by the web application, a signing of the unsigned transaction to create a signed transaction;

receiving, by the service, the request for signing the transaction;

determining, by the service, the address corresponding to the bitcoin address in the unsigned transaction;

determining, by the service, the private key stored in association with the address;

signing, by the service, the transaction with the private key to create the signed transaction;

providing, by the service, the signed transaction to the web application;

receiving, by the web application, the signed transaction; and broadcasting, by the web application, the signed transaction over the bitcoin network.

7. The method of claim 6, further comprising:

storing, by a master key loader executed by one or more of the set of host computer devices, an operational master key in memory of a service; and encrypting, by the service, the private key with the operational master key to generate an encrypted private key that is stored; and decrypting, by the service, the encrypted private key with the operational master key to generate a decrypted private key for signing the transaction.

8. The method of claim 7, further comprising:

creating, by a key ceremony application service executed by one or more of the set of host computer devices, a for-distribution master key;

storing, by the key ceremony application, the for-distribution master key in the memory;

splitting, by the key ceremony application, the for-distribution master key into N shares;

distributing, by the key ceremony application, the N shares among N custodians;

clearing, by the key ceremony application, the for-distribution master key from the memory;

receiving, by the key ceremony application, at least M of the N shares, where M is equal to or less than N; and deriving, by the key ceremony application, the operational master key from the M shares before storing the operational master key in the memory.

9. The method of claim 6, further comprising:

detecting, by the service, a freeze flag on-state;

disallowing, by the service, signing of the transaction in response to detecting the freeze flag on-state;

detecting, by the service, a freeze flag off-state; and allowing, by the service, signing of the transaction in response to detecting the freeze flag off-state.

10. The method of claim 9, further comprising:

receiving, by the service, at least a plurality of authenticated requests to unfreeze transaction signing, the service allowing signing of the transactions upon a determination by the service that the plurality of authenticated requests is at least equal to a predetermined number.

11. A non-transitory computer-readable medium having stored thereon a set of instructions that, when executed by a processor of a computer carries out a method of transacting bitcoin comprising:

receiving by a web application executed by one or more of a set of host computer devices, prior to receiving a request for payment, a request for a first address;

requesting, by the web application, the first address from a service;

receiving, by a service executed by one or more of the set of host computer devices, the request for the first address;

generating, by the service, the first address and a private key in response to the request for the first address;

storing, by the service, the address and the private key;

providing, by the service, the first address to the web application;

receiving, by the web application, the first address from the service;

transmitting, by the web application, the first address to the customer computer system;

receiving, by the web application, a request for payment to a bitcoin address, the request for payment including an amount of bitcoin to be paid;

generating, by the web application, an unsigned transaction in response to receiving the request for payment, the unsigned transaction including the amount of bitcoin to be paid in the request for payment;

requesting, by the web application, a signing of the unsigned transaction to create a signed transaction;

receiving, by the service, the request for signing the transaction;

determining, by the service, the first address corresponding to the bitcoin address in the unsigned transaction;

determining, by the service, the private key stored in association with the first address;

signing, by the service, the transaction with the private key to create the signed transaction;

providing, by the service, the signed transaction to the web service;

receiving, by the web application, the signed transaction; and broadcasting, by the web application, the signed transaction over a bitcoin network.

\* \* \* \* \*